(12) United States Patent
Raeth

(10) Patent No.: US 12,071,781 B2
(45) Date of Patent: Aug. 27, 2024

(54) HUNTING BLIND

(71) Applicant: Mark Raeth, Shelby, MI (US)

(72) Inventor: Mark Raeth, Shelby, MI (US)

(73) Assignee: Mark Raeth, Shelby, MI (US)

( * ) Notice: Subject to any disclaimer, the term of this patent is extended or adjusted under 35 U.S.C. 154(b) by 169 days.

(21) Appl. No.: 17/815,030

(22) Filed: Jul. 26, 2022

(65) Prior Publication Data
US 2023/0022868 A1 Jan. 26, 2023

Related U.S. Application Data

(60) Provisional application No. 63/225,657, filed on Jul. 26, 2021.

(51) Int. Cl.
*E04H 15/00* (2006.01)
*A01M 31/02* (2006.01)

(52) U.S. Cl.
CPC ......... *E04H 15/001* (2013.01); *A01M 31/025* (2013.01); *E04H 15/008* (2013.01)

(58) Field of Classification Search
CPC ............................ E04H 15/001; A01M 31/025
See application file for complete search history.

(56) References Cited

U.S. PATENT DOCUMENTS

| | | | | |
|---|---|---|---|---|
| 2,992,503 A * | 7/1961 | Webb | ................ | A01M 31/025 135/901 |
| 3,513,605 A * | 5/1970 | Smith | ................ | A01M 31/025 52/36.2 |
| 3,622,201 A * | 11/1971 | Radig | ................ | A01M 31/025 135/96 |
| 3,787,912 A * | 1/1974 | Huey, Jr. | ................ | B63B 1/041 43/1 |
| 3,848,352 A * | 11/1974 | Sayles | ................ | A01M 31/025 43/1 |
| 3,886,678 A * | 6/1975 | Caccamo | ............ | A01M 31/025 43/1 |
| 3,902,264 A * | 9/1975 | Radig | ................ | A01M 31/025 135/147 |
| 4,164,089 A * | 8/1979 | George | ............... | A01M 31/025 52/2.21 |
| 5,906,217 A * | 5/1999 | Hill | ........................ | E04H 15/48 135/132 |
| 6,016,823 A * | 1/2000 | Hill | ........................ | E04H 15/48 135/132 |

(Continued)

*Primary Examiner* — David R Dunn
*Assistant Examiner* — Danielle Jackson
(74) *Attorney, Agent, or Firm* — Bodman PLC

(57) ABSTRACT

A hunting blind includes a base portion including a plurality of lower arcuate segments configured to be coupled to one another. The hunting blind also includes an upper portion coupled to the base portion and including a plurality of upper arcuate segments configured to be coupled to the base portion. Additionally, the hunting blind includes a cover hingedly coupled to the upper portion and configured to be moved between an open position and a closed position. Moreover, the hunting blind includes an actuator coupled to the base portion or to the upper portion and configured to move the cover from the closed position to the open position, and wherein the actuator is a hands-free actuator such that the actuator is configured to be actuated by a user's foot, knee, or elbow.

14 Claims, 6 Drawing Sheets

(56) References Cited

U.S. PATENT DOCUMENTS

| | | | |
|---|---|---|---|
| 6,415,807 B1 * | 7/2002 | Maher | A01M 31/06 |
| | | | 135/901 |
| 6,769,442 B2 * | 8/2004 | Johnson | A01M 31/025 |
| | | | 135/96 |
| 8,756,872 B2 * | 6/2014 | Preg | A01M 31/025 |
| | | | 135/901 |
| 2005/0028854 A1 * | 2/2005 | Erickson | E04H 15/001 |
| | | | 135/901 |
| 2010/0229906 A1 * | 9/2010 | Putman | A01M 31/025 |
| | | | 135/96 |

* cited by examiner

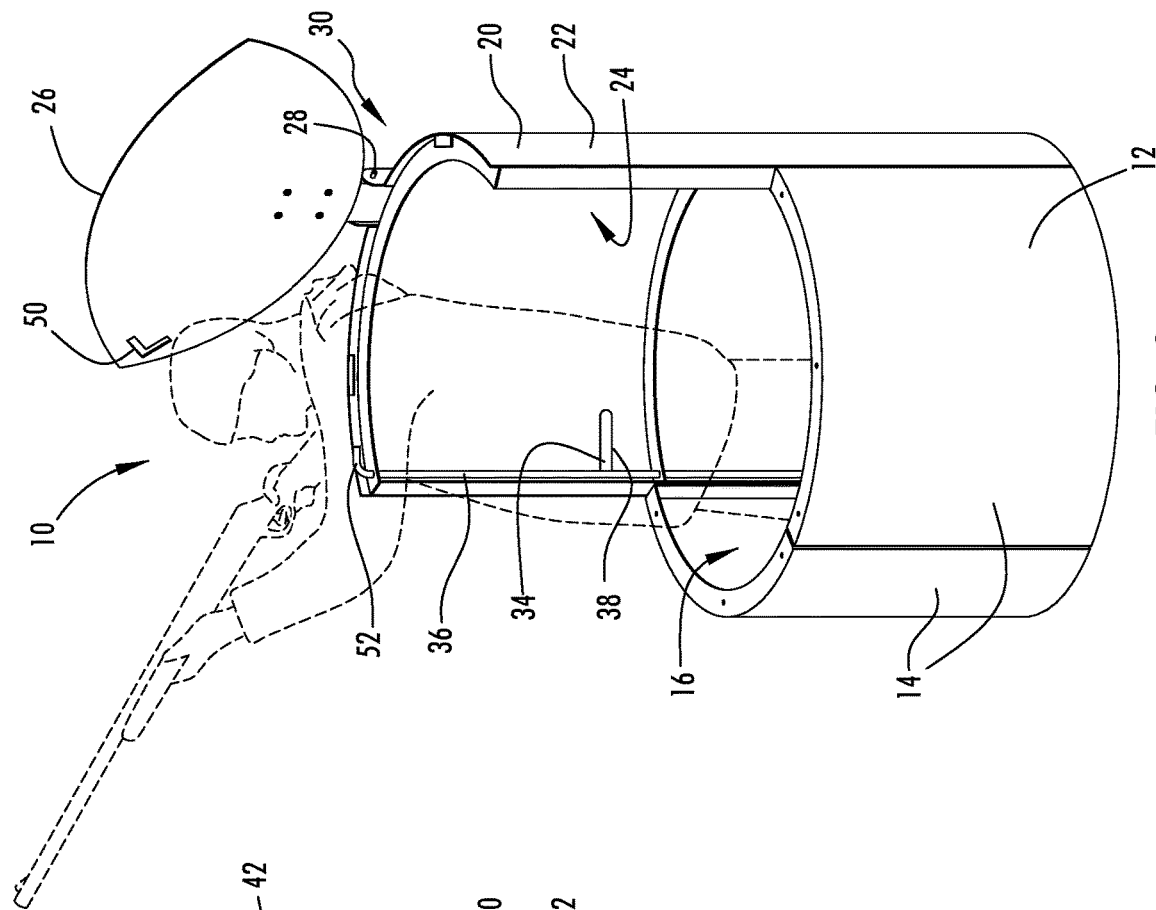
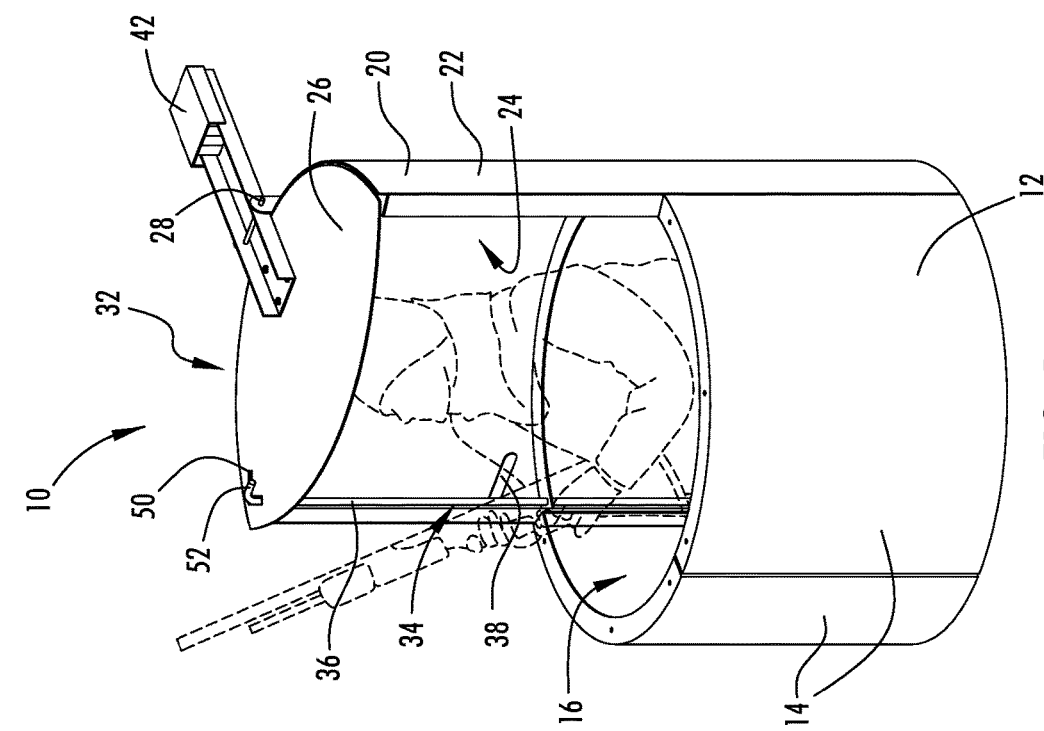

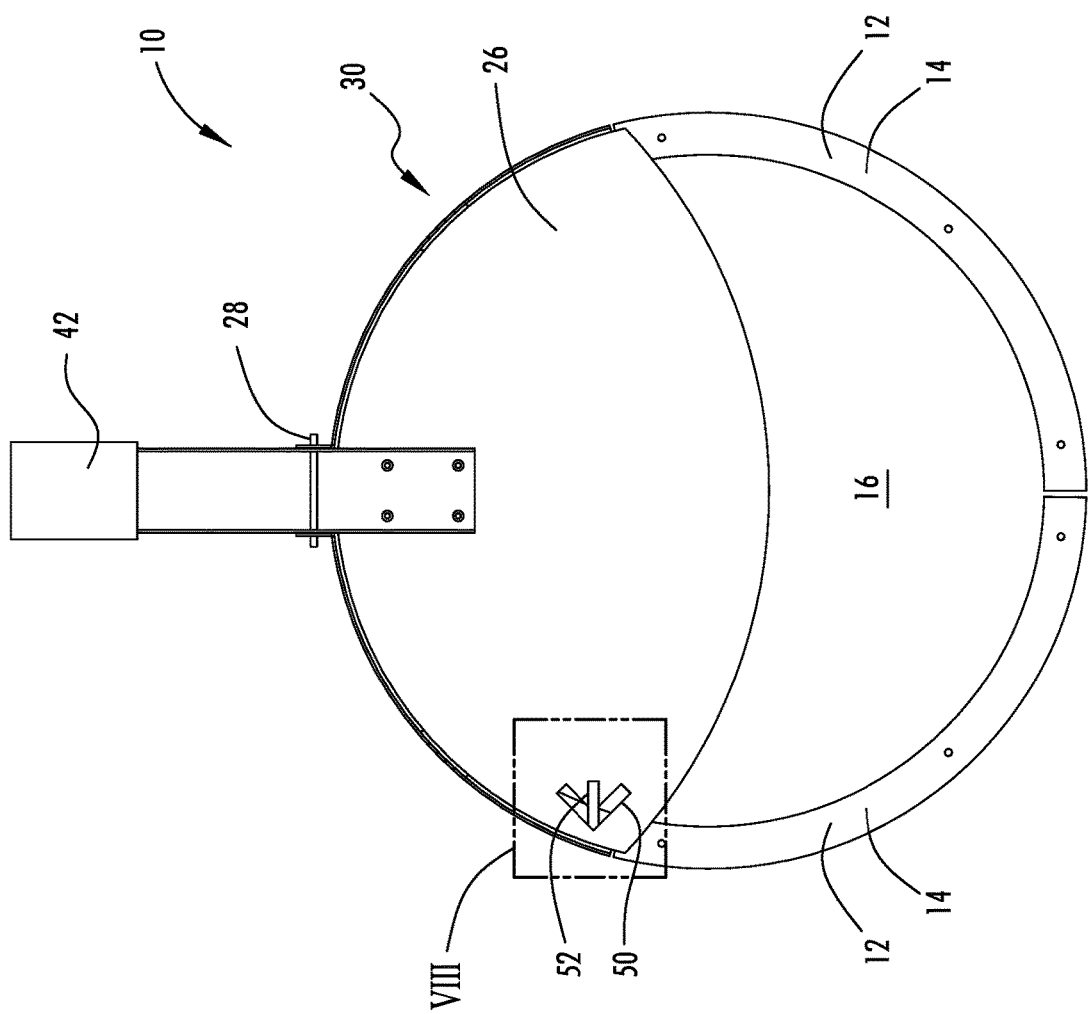

HUNTING BLIND

CROSS-REFERENCE TO RELATED APPLICATION

This application claims priority under 35 U.S.C. § 119(e) to U.S. Provisional Patent Application No. 63/225,657, filed Jul. 26, 2021, the disclosure of this prior application is considered part of this application and is hereby incorporated by reference in its entirety.

TECHNICAL FIELD

The present disclosure relates generally to hunting blinds, subassemblies, and components thereof.

BACKGROUND

While hunting blinds including covers are known, there remains an opportunity to provide a hunting blind that easy to move, provides sufficient concealment in hunting different game, and has an improved cover actuation system, among other advantages over known blinds.

SUMMARY

The present disclosure provides a hunting blind having a hands-free actuator while maintaining a light-weight and durable structure. Having the hands-free actuator allows the user to maintain control of a weapon and quickly fire at a desired target. The light-weight and durable structure allows the user to easily carry the hunting blind to the desired location while the beneficial structure is maintained providing a compact and enhanced performance hunting blind.

According to one aspect of the present disclosure, a hunting blind includes a base portion including a plurality of lower arcuate segments configured to be coupled to one another. The hunting blind also includes an upper portion coupled to the base portion and including at plurality of upper arcuate segments configured to be coupled the plurality of lower arcuate segments. Additionally, the hunting blind includes a cover hingedly coupled to the upper portion and configured to be moved between an open position and a closed position. Moreover, the hunting blind includes an actuator coupled to the base portion or to the upper portion and configured to move the cover from the closed position to the open position. For example, the actuator may be a hands-free actuator such that the actuator is configured to be actuated by a user's foot, knee, or elbow.

According to another aspect of the present disclosure, a hunting blind includes a first arcuate segment, a second arcuate segment including an upper arcuate segment. The first arcuate segment and the second arcuate segment are configured to be coupled to one another to form a hollow interior. The hunting blind also includes a cover hingedly coupled to the upper arcuate segment and configured to be moved between an open position and a closed position. The cover is configured to cover a portion of the hollow interior in the closed position. The hunting blind further includes an actuator configured to move the cover from the closed position to the open position. The actuator is a hands-free actuator such that the actuator is configured to be actuated by a user's foot, knee, or elbow.

According to yet another aspect of the present disclosure, a hunting blind includes a first arcuate segment and a second arcuate segment including an upper arcuate segment. The first arcuate segment and the second arcuate segment are configured to be carried to a location separately and assembled at the location to form a hollow interior. The hunting blind also includes a cover hingedly coupled to the upper arcuate segment and configured to be moved between an open position and a closed position. Further, the hunting blind includes an actuator configured to move the cover from the closed position to the open position. The actuator is a hands-free actuator such that the actuator is configured to be actuated by a user's foot, knee, or elbow.

In some implementations, the actuator comprises an actuation rod and a pedal configured to be actuated to move the cover from the closed position to the open position.

In some implementations, the pedal comprises an upper pedal and a lower pedal and both the upper pedal and the lower pedal are configured to be actuated by a user's foot, knee, or elbow.

In some implementations, the actuation rod extends from the cover to the base portion.

In some implementations, the actuation rod is coupled to an inside of one of the first arcuate segment or the second arcuate segment.

In some implementations, one of the plurality of upper arcuate segments is integral with one of the plurality of lower arcuate segments.

In some implementations, the plurality of the lower arcuate segments and at least one upper arcuate segments define a hollow interior and the cover is configured to cover a portion of the hollow interior.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

FIG. 1 is front perspective view of one example of a hunting blind having a cover in a closed position;

FIG. 2 is front perspective view of the hunting blind of FIG. 1 having the cover in an open position;

FIG. 7 is a top plan view of the hunting blind of FIG. 1;

DETAILED DESCRIPTION

Figure 4:
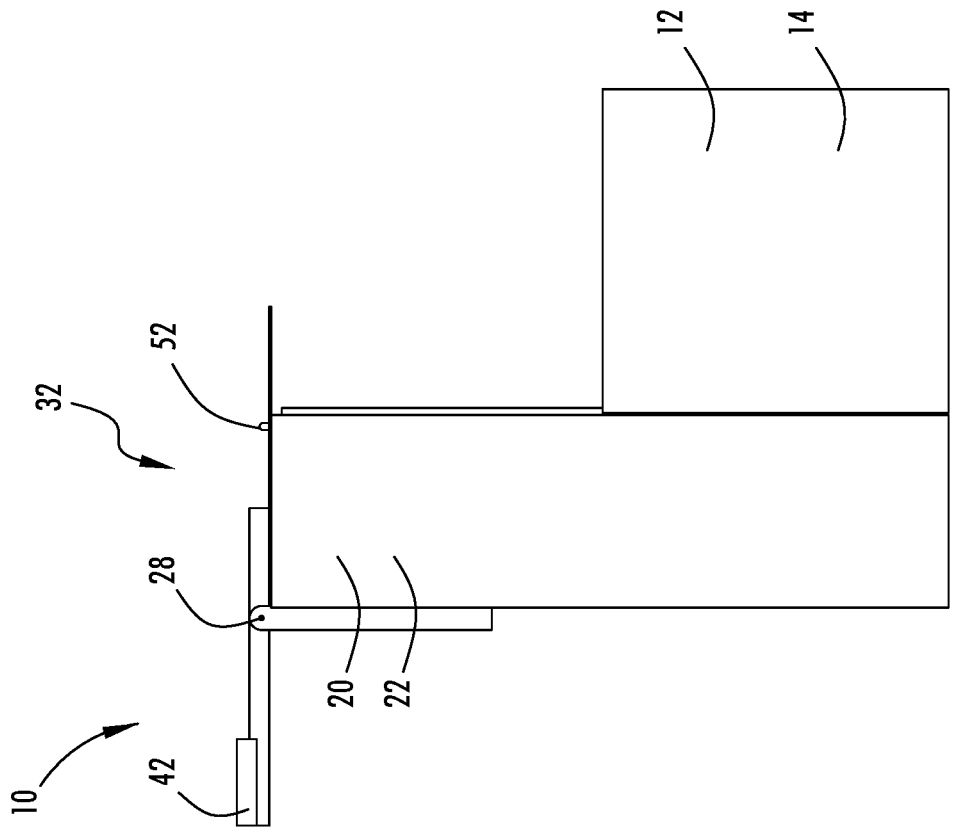
FIG. 4 is a side plan view of the hunting blind of FIG. 3.
Figure 3:
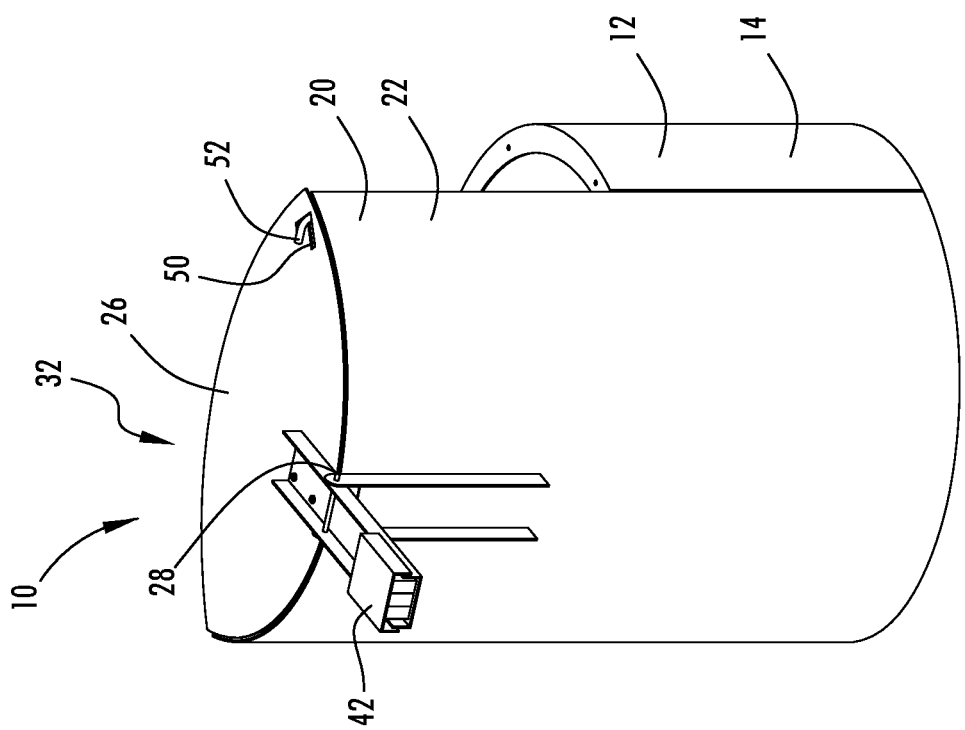
FIG. 3 is a rear perspective view of the hunting blind of FIG. 1 having the cover in the closed position.
Figure 6:
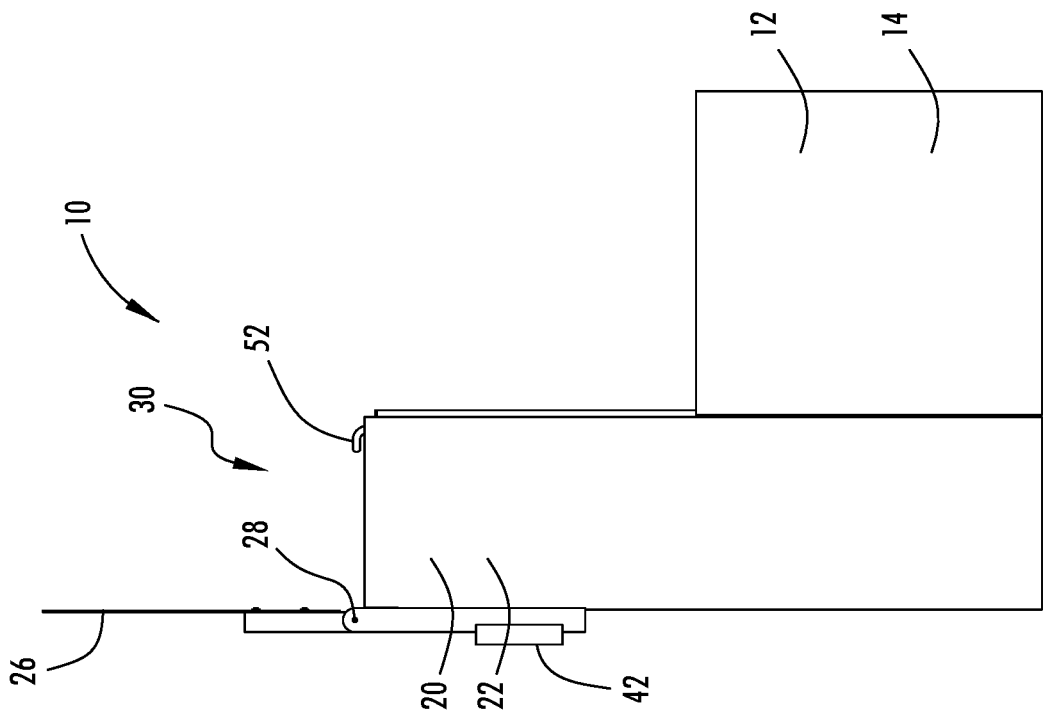
FIG. 6 is a side plan view of the hunting blind of FIG. 5.
Figure 5:
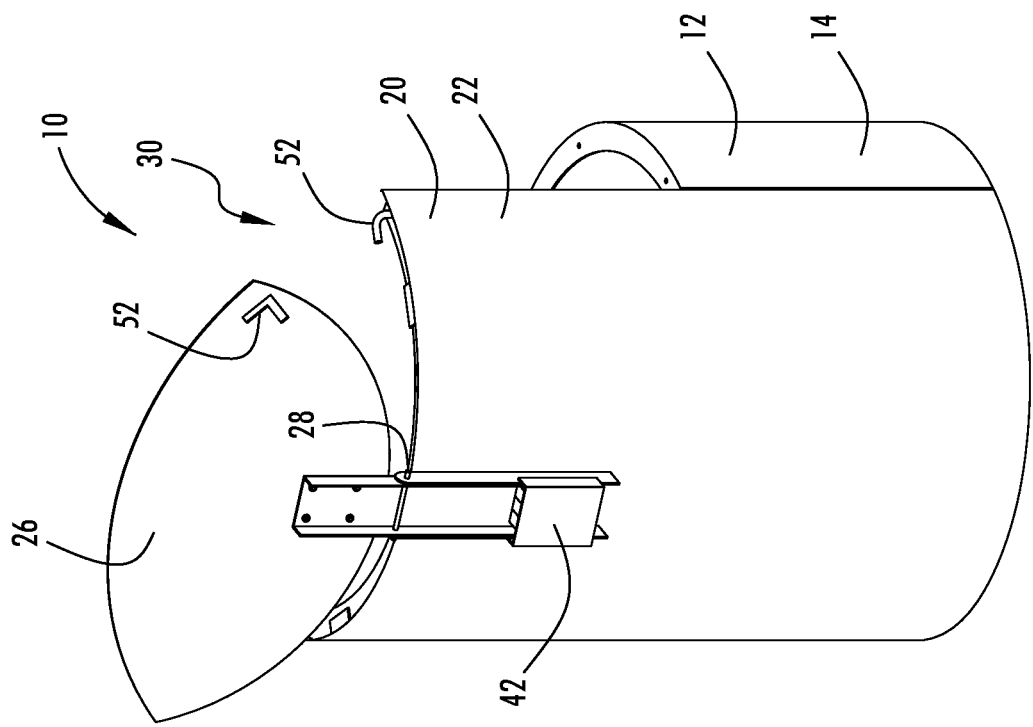
FIG. 5. is a rear perspective view of the hunting blind of FIG. 2 having the cover in an open position.
Figure 8:
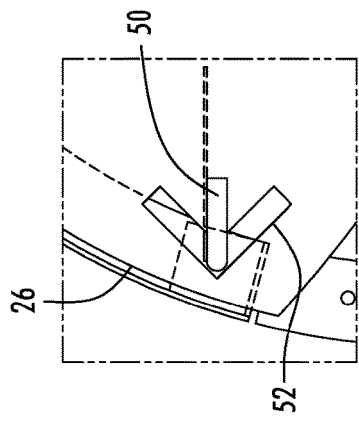
FIG. 8 is a close up view of the portion of the cover shown in FIG. 5 having an actuation mechanism in an unactuated position.
Figure 8A:
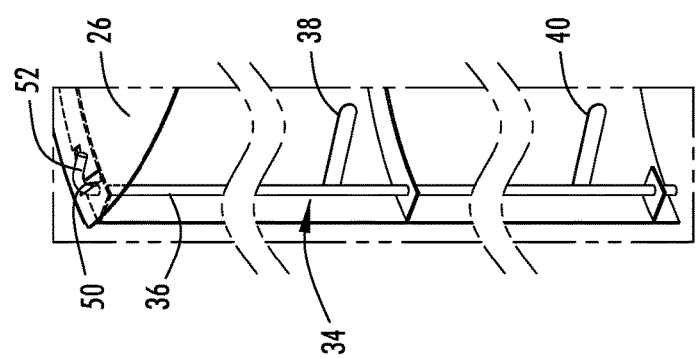
FIG. 8A is a partial cross sectional view of the actuation mechanism in the unactuated position.

Referring now to the drawings and the illustrative examples depicted therein, a hunting blind is generally disclosed at reference numeral 10. The hunting blind 10 is configured to conceal and shelter a user inside for hunting purposes, such as in a kneeling, sitting, or standing pose, as may be desirable for different hunting environments. The hunting blind 10 may be placed by a user in a temporarily hunting location within a hunting environment. The user is typically a hunter and the hunting location may be any hunting location including but not limited to a forest, a field, a pond, a lake, or the like.

As shown in FIG. 1, the hunting blind 10 includes a base portion 12, sometimes referred to as a "stump portion." In the example shown in FIG. 1, the base portion 12 includes a plurality of lower arcuate segments 14 configured to be coupled to one another and defining a lower interior 16. The lower arcuate segments 14 may be arranged forming at least a portion of a circle-shaped base structure. It is also contemplate that the lower arcuate segments 14 may be movable in relation to one another such that the circumference of the lower interior may be increased or decreased. In some examples, the lower arcuate segments 14 are coupled together using fasteners (e.g., pins that are removably disposed within aligned passages of neighboring lower arcuate segments 14). However, the lower arcuate segments 14 may be coupled together with additional or alternative means, including but not limited to by adhesive, welding, and/or hook and eye fasteners. Further, the lower arcuate segments may be attached together with hinge connections, such that the two front segments may open outward away from each other to allow ingress/egress from the hunting blind, such as to allow for wheel chair access. In the example shown in FIG. 1, the base portion 12 includes three lower arcuate segments 14. In other examples, more or less lower arcuate segments may be used to form the enclosing base portion. Moreover, the base portion 12 shown in FIG. 1 is cylindrical in shape such that the shape is similar to a tree stump. However, the base portion in additional examples may be of any size and/or shape that is configured to have a user and/or a stool located within the interior of the base portion.

In some examples, the lower arcuate segments 14 are comprised of a plastic molded material. The plastic molded material provides the strength to maintain the shape of the base portion 12 while being lightweight enough that a user can easily carry the hunting blind 10 to the desired hunting location. However, it is also contemplated that the lower arcuate segments 14 may be comprised of another strong yet lightweight material such as thin walled steel or aluminum, reinforced nylon, or another metallic or plastic polymer or composite material. It is also contemplated that the base portion 12 may have an outside surface texture and/or color in order to cause the base portion 12 to resemble a nature inspired texture, such as tree bark, that provides camouflage for the hunting blind 10 when positioned within a hunting location. Further, one or more of the lower arcuate segments 14 may include one or more apertures disposed there through having the purpose of expanding the hunter's field of view, such as to allow the hunter to see their prey moving outside the main window area. The apertures may also or alternatively be disposed along an upper edge of the lower arcuate segments, so as to be configured to receive camouflaging material, such as sticks, reeds, or other plant material or the like.

Referring still to FIG. 1, the hunting blind 10 also includes an upper portion 20 coupled to the base portion 12. The upper portion 20 includes one or more upper arcuate segments 22 configured to be coupled to one other and defining an upper interior 24. In the example shown in the figures, the upper portion 20 comprises a single upper arcuate segment 22, however, more upper arcuate segments 22 may be present. Similar to the lower arcuate segments 14, if multiple upper arcuate segments 22 are present, the upper arcuate segments 22 may coupled together using fasteners (e.g., pins that are removably-disposed within aligned passages of neighboring lower arcuate segments 14). Further, the upper arcuate segments 22 may be otherwise coupled with adhesive, welding, and/or hook and eye fasteners. Moreover, the upper portion 20 shown in FIG. 1 is an arcuate segment of a cylindrical shape. However, the upper portion 20 may be of any size and/or shape configured to conceal an upper portion of a user located within the interior of the hunting blind.

In the example shown in FIGS. 1-6, the upper arcuate segment 22 is formed integrally with one of the lower arcuate segments 14 such that the upper arcuate segment extends upward from the lower arcuate segment 14. However, it is also contemplated that the upper portion 20 may be coupled to the base portion 12 using removable fasteners such that the upper portion 20 and the base portion 12 easily separate for ease of traveling to the hunting location and can be re-coupled once the desired location is reach. It is also contemplated that the upper portion 20 and the base portion 12 may be permanent coupled, such as by welding, or adhesives, if desired.

In some examples, the upper arcuate segment or segments may be comprised of a plastic molded material. The plastic molded material provides the strength to maintain the shape of the upper portion 20 while being lightweight enough that a user can easily carry the hunting blind 10 to the desired hunting location. The hunting blind 10 may be transported to the desired hunting location as a single assembled piece or may be transported in segments, which are then coupled to one another once the desired hunting location is reached. In additional examples, the upper arcuate segment or segments may be comprised of another strong yet lightweight material such as thin walled steel, reinforced nylon, or anther metallic or plastic polymer or composite material. It is also contemplated that the upper portion 20 may have a surface texture and/or color in order to cause the upper portion 20 to resemble a nature inspired texture, such as tree bark that provides camouflage for the hunting blind 10 when positioned within a hunting location. In the example shown in FIGS. 1-6, the upper arcuate segment is not disposed around the entire circumference of the base portion, such that an opening or window area exists to provide a primary field of view, allowing the hunter to watch for prey. However, one or more of the upper arcuate segments 22 may include one or more apertures disposed there through to expand the field of view.

As shown in FIG. 1, the upper portion 20 only includes a single upper arcuate segment and the single upper arcuate segment is configured to hold a concealment for the window area, such as a curtain rod or other concealment support, which may form the remainder of the circumference around the upper portion. The curtain may provide, among other things, air flow to the user and may also have a surface texture and/or color to provide camouflage for the hunting blind 10 when positioned within the hunting location.

In some examples, an arcuate segment is one or more of the lower arcuate segment or the upper arcuate segment, such that the arcuate segment may be the lower arcuate segment, the upper arcuate segment, or a segment which has both a lower arcuate segment portion and the upper arcuate segment portion integrated together. Similarly, other arcuate segments may also be one or more of the lower arcuate segment and the upper arcuate segment, such that these additional arcuate segments may also be the lower arcuate segment, the upper arcuate segment, or a segment that has integrated both a lower arcuate segment portion and an upper arcuate segment portion. In different examples, the number of arcuate segments that are used to form the hunting blind may vary for different sizes, shapes, and desired break-down segment sizes. In some examples, the separate arcuate segments can easily couple and uncouple, such that a user can carry the first arcuate segment and the second arcuate segment separately to a hunting location where they are then assembled, with or without the use of accessory tools.

The hunting blind 10 also includes a cover 26 coupled to the upper portion 20. In the example shown in FIGS. 1-7, the cover 26 is coupled to the upper portion 20 using a hinge mechanism 28, such as a hinge pin. However, in additional examples, the cover 26 may be coupled to the upper portion 20 using springs, fasteners, and/or other coupling mechanisms. Moreover, the cover 26 is configured to be moved between an open position 30 and a closed position 32. In the closed position 32, an outer portion of the cover 26 rests on the upper portion 20. In the example shown in FIG. 1, the cover 26 is has a partially circular edge, such that when the cover 26 is in the closed position 32, the circumference of the cover 26 rests on the upper arcuate segments 22 and defines the interior of the hunting blind 10. In other words, when the cover 26 is closed, the user or other object within the interior of the hunting blind 10 is at least partially concealed from above the hunting blind 10. When the cover 26 is in the open position 30, the cover 26 is configured to be moved away from the interior of the hunting blind 10 such that a user can stand upright without hindrance from the cover 26. In the example shown in FIGS. 1 and 2, the cover 26 pivots approximately 90 degrees about the hinge 28, such that the cover 26 extends upwards from the hinge 28 and is disposed away from the user in the open position 30. It is also contemplated that the open position of the cover 26 is the cover being pivoted at least 30 degrees, 45 degrees, or 60 degrees. In additional examples, the cover may not have pivoting hinge, and instead may rotate the cover in the plane of the closed position or may otherwise be moved to the open position by being differently moved out of the way from the user to expand the window area and allow the hunter assume a shooting position, such as for overhead game.

As shown in FIGS. 8-10A, the hunting blind 10 may also include an actuator 34 coupled to the base portion 12 and/or to the upper portion 20. The actuator 34 is configured to move the cover 26 from the closed position 32 to the open position 30. In some examples, the actuator 34 is a hands-free actuator 34 such that the actuator 34 is configured to be actuated by a user's foot, knee, or elbow while allowing the user to keep both hands on a weapon. Having the actuator 34 be hands-free, the actuator 34 allows the user to better control the weapon to prevent accidents and to hit a desired target.

In some examples, the actuator 34 may be a pedal disposed on an inside surface of the base portion 12 and configured to be actuated by a user's foot or knee. In other examples, the actuator 34 may be a pedal disposed on an inside surface of the upper portion 20 and configured to be actuated by a user's knee or elbow. In yet additional examples, the actuator 34 may be a plurality of actuator 34 disposed in multiple locations about the inside surface of the base portion 12 and/or upper portion 20 and actuation of any one of the plurality of actuator 34 results in the movement of the cover 26 from the closed position 32 to the open position 30.

In the example shown in FIGS. 8-10A, the actuator 34 includes an actuation rod 36 coupled to the cover 26 and having a length that extends from the cover 26 to the base portion 12. In the example shown in FIG. 2, the actuation rod 36 is coupled to an inside of the base portion 12. However, it is contemplated that the actuation rod 36 may be disposed on the exterior of the base portion 12 and/or of the upper portion 20. In the example shown, the actuation rod 36 includes an upper pedal 38 and a lower pedal 40, both configured for hands-free actuation. In the example shown, actuation of the actuator 34 includes applying force in a rotating motion to one or more of the upper pedal 38 or lower pedal 40. However, it is also contemplated that actuation may include applying force in a down ward or upward motion on one or more of the upper pedal 38 and/or lower pedal 40. Moreover, the cover 26 may be spring loaded such that actuation includes moving laterally or rotating a surface such as unlatching a lock or latch mechanism to allow the cover 26 to be moved from the closed position 32 to the open position 30.

Figure 9:
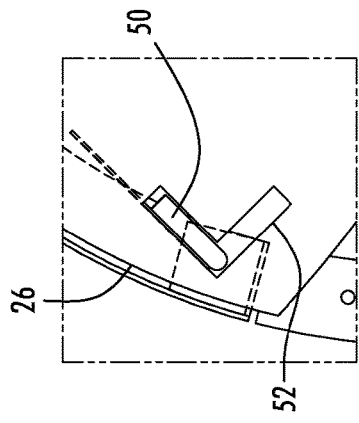
FIG. 9 is a close up view of the portion of the cover section shown in FIG. 5 having the actuation mechanism in an actuated position.
Figure 9A:
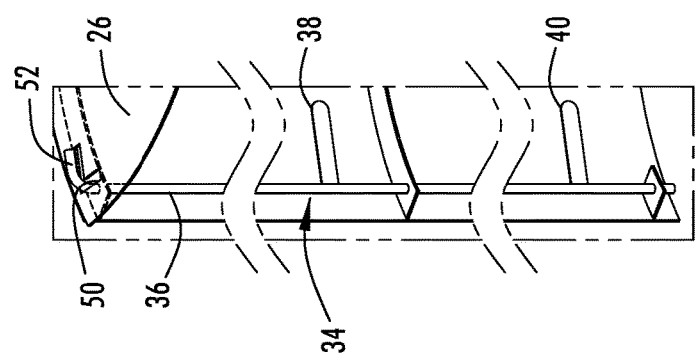
FIG. 9A is a partial cross sectional view of the actuation mechanism in the actuated position.
Figure 10:
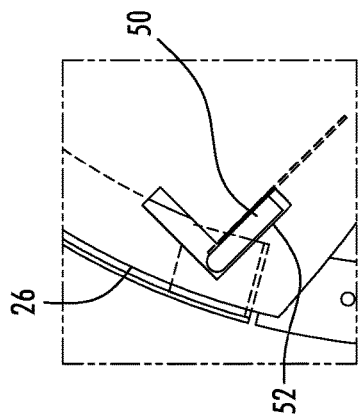
FIG. 10 is a close up view of the portion of the cover section shown in FIG. 5 having the actuation mechanism in the actuated position.
Figure 10A:
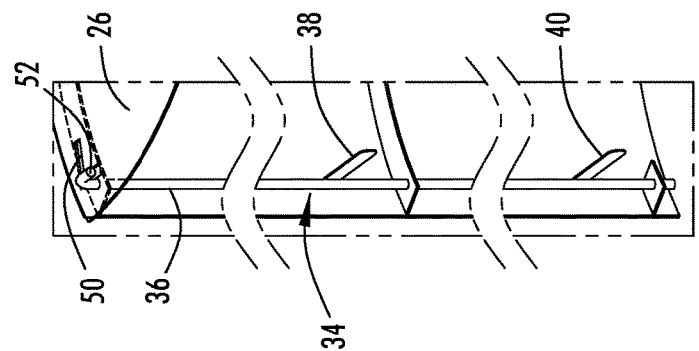
FIG. 10A is a partial cross sectional view of the actuation mechanism in the actuated position.

As shown in the FIGS. 3-7, the cover 26 may be coupled to a weight 42. The weight 42 is configured to assist in moving the cover 26 from the closed position 32 to an open position 30. The weight 42 is configured to bias the cover in the open position 30. For example, as shown in FIGS. 7-10A, the cover includes a slot 50 disposed there though. In the example shown, the cover defines the slot 50 which is V-shaped. Moreover, the actuation rod 36 is configured to be disposed through the slot 50 and the actuation rod includes a hook 52 configured to engage the cover 26 and secure the cover 26 in the closed position 32. In the example shown in FIG. 8, when the cover 26 is in the closed position 32, the hook 52 of the actuation rod 36 is disposed at the vertex of the V-shaped slot and the hook 52 extends to the portion of the cover 26 adjacent to the vertex and thus secures the cover 26 in the closed position 32. When desired by a user to move the cover 26 to the open position 30, the user actuates the actuation rod 36 which rotates the hook 52 of the actuation rod 36 so that the hook 52 is in line with the slot 50 allowing the weight 42 to move the cover 26 to the open position 30. As shown in FIGS. 9-10A, the actuation rod 36 may be actuated in either rotational direction to move the cover 26 from the closed position 32 to the open position 30.

In the example shown, in operation, the cover 26 begins in the closed position 32 and the actuation rod 36 is configured to engage the cover 26 through the V-shaped slot which balances the mass of the weight 42 and keeps the cover 26 closed. When desired by the user, one or more of the upper or lower pedals 38, 40 may be actuated by a user's elbow/knee/foot which moves the hook 52 of the actuation rod 36 in line with the slot 50 such that the hook 52 moves through the slot 50 and away from the cover 26 such that the weight 42 is configured to move the cover 26 to the open position 30 allowing the user to stand fully and operate the weapon. When desired, the user may move the cover 26 back to the closed position 32 by manually moving the cover 26 to the closed position 32 and using one or more of the upper or lower pedal 38, 40 to engage the hook 52 of the actuation rod 36 with the cover 26 to hold the cover 26 in the closed position 32.

It is contemplated that the hunting blind 10 may include features such that the cover 26 can be closed automatically, or by user actuation of another actuator 34 configured to move the cover 26 from the open position 30 to the closed position 32. Moreover, it is contemplated the actuator 34 may be configured to also move the cover 26 from the open position 30 to the closed position 32 upon application of the opposite force as was applied to the actuator 34 to move the cover 26 from the closed position 32 to the open position 30. It is also contemplated that the cover 26 may be moved from the open position 30 to the closed position 32 by the user, when desired.

Figure 11:
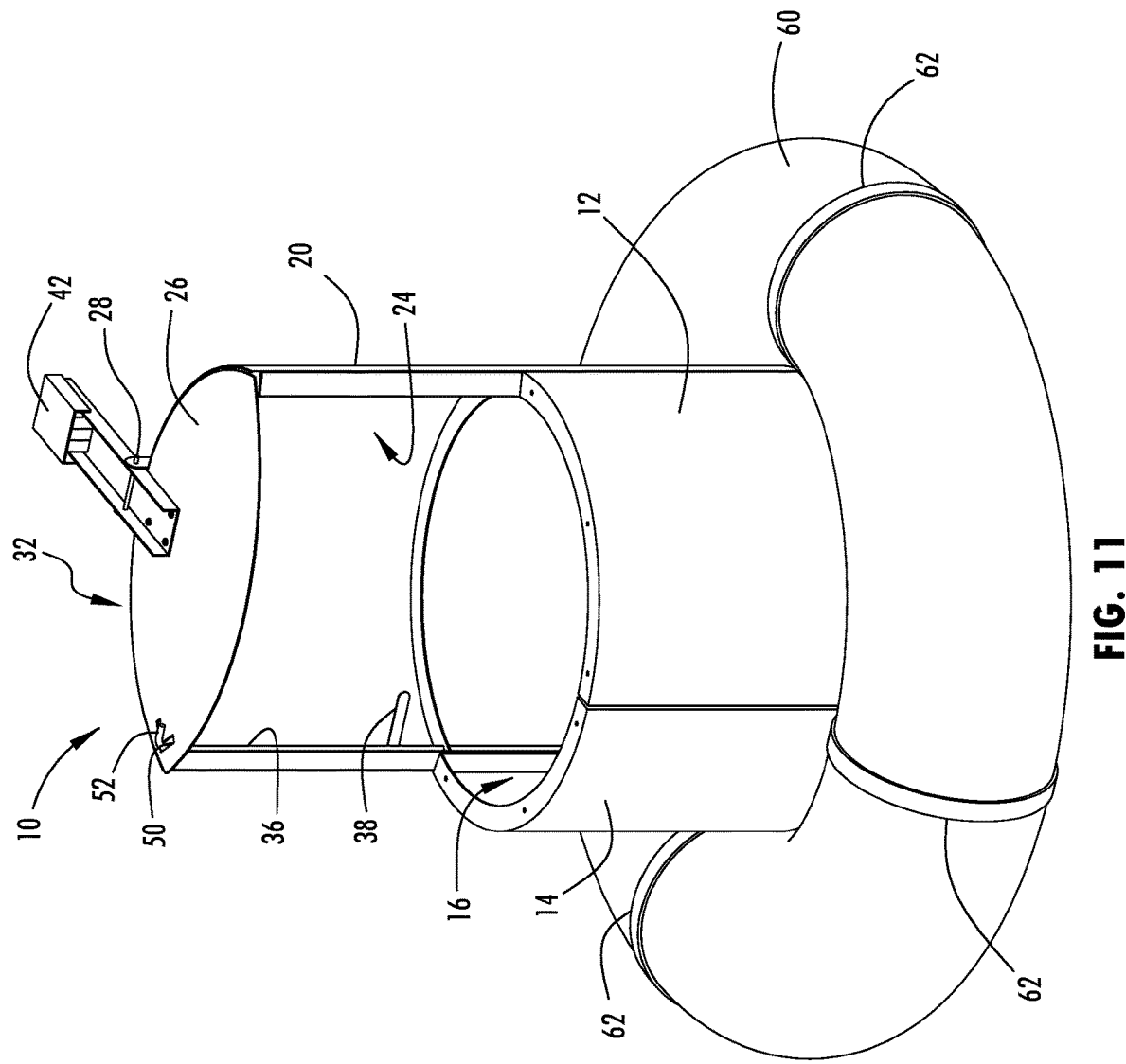
FIG. 11 is a perspective view of another example of a hunting blind.

The hunting blind may further include other configurations. For example, as seen in FIG. 11, a lower end of the base portion 12 may include a flotation portion 60 in order to adapt the hunting blind 10 for support on a lake, stream, or river for the purpose of hunting ducks or the like. In the example shown in FIG. 11, the flotation portion 60 is disposed around the circumference of the base portion 12 and includes a bottom configured to hold a user and/or a stool such that the user and/or stool may contain themselves within the hunting blind 10 on top of the water. In other examples, the flotation portion 60 may be disposed below the base portion 12, such that the lower edge of the base portion 12 is supported by or resting on the flotation portion 60. In some examples, the floatation portion 60 does not include a bottom portion such that a user and/or stool may be placed directly in shallow water. The base portion 12 may also include a plurality of coupling apertures which allow coupling of the flotation portion 60 to the base portion 12. In some examples, the coupling includes a plurality of flotation straps 62 coupled to the flotation portion 60 and configured to be disposed through the coupling apertures on the base portion 12 to securely couple the flotation portion 60 and the base portion 12, however, other coupling mechanism have been contemplated.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary.

Furthermore, to the extent that the terms "includes," "has," or "having" or variations in form thereof are used in either the detailed description or the claims, such terms are intended to be inclusive in a manner similar to the term "comprising" as "comprising" is interpreted when employed as a transitional word in a claim.

It is also to be understood that the specific devices and processes illustrated in the attached drawings and described in this specification are examples of aspects of the inventive concepts defined in the appended claims. Hence, specific dimensions and other physical characteristics relating to the examples disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately" and "substantially" may refer to an amount that is within less than 5% of, within less than 1% of, within less than 0.1% of, and within less than 0.01% of a stated amount.

What is claimed is:

1. A hunting blind comprising:
   a base portion including a plurality of lower arcuate segments configured to be coupled to one another;
   an upper portion coupled to the base portion and including at least one upper arcuate segment configured to be coupled to the base portion;
   a cover hingedly coupled to the upper portion and configured to be moved between an open position and a closed position; and
   an actuator coupled to the base portion or to the upper portion and configured to move the cover from the closed position to the open position, and wherein the actuator is a hands-free actuator such that the actuator is configured to be actuated by a user's foot, knee, or elbow;
   wherein the actuator comprises an actuation rod and a pedal configured to be actuated to move the cover from the closed position to the open position; and
   wherein the pedal comprises an upper pedal and a lower pedal and both the upper pedal and the lower pedal are configured to be actuated by a user's foot, knee, or elbow.

2. The hunting blind of claim 1, wherein the actuation rod extends from the cover to the base portion.

3. The hunting blind of claim 2, wherein the actuation rod is coupled to an inside of the base portion.

4. The hunting blind of claim 1, wherein one of the plurality of upper arcuate segments is integral with one of the plurality of lower arcuate segments.

5. The hunting blind of claim 1, wherein the plurality of the lower arcuate segments and at least one upper arcuate segments define a hollow interior and the cover is configured to cover a portion of the hollow interior.

6. A hunting blind comprising:
a first arcuate segment;
a second arcuate segment including an upper arcuate segment, wherein the first arcuate segment and the second arcuate segment are configured to be coupled to one another to form a hollow interior;
a cover hingedly coupled to the upper arcuate segment and configured to be moved between an open position and a closed position, wherein the cover is configured to cover a portion of the hollow interior in the closed position; and
an actuator configured to move the cover from the closed position to the open position, and wherein the actuator is a hands-free actuator such that the actuator is configured to be actuated by a user's foot, knee, or elbow;
wherein the actuator comprises an actuation rod and a pedal configured to be actuated to move the cover from the closed position to the open position; and
wherein the pedal comprises an upper pedal and a lower pedal and both the upper pedal and the lower pedal are configured to be actuated by a user's foot, knee, or elbow.

7. The hunting blind of claim 6, wherein the actuator is coupled to an interior of one of the first arcuate segment or the second arcuate segment.

8. The hunting blind of claim 6, wherein the actuation rod extends from the cover to a base portion.

9. The hunting blind of claim 6, wherein the upper arcuate segment is integral with a lower arcuate segment.

10. A hunting blind comprising:
a first arcuate segment;
a second arcuate segment including an upper arcuate segment, wherein the first arcuate segment and the second arcuate segment are configured to be carried to a location separately and assembled at the location to form a hollow interior;
a cover hingedly coupled to the upper arcuate segment and configured to be moved between an open position and a closed position; and
an actuator configured to move the cover from the closed position to the open position, and wherein the actuator is a hands-free actuator such that the actuator is configured to be actuated by a user's foot, knee, or elbow;
wherein the actuator comprises an actuation rod and a pedal configured to be actuated to move the cover from the closed position to the open position; and
wherein the pedal comprises an upper pedal and a lower pedal and both the upper pedal and the lower pedal are configured to be actuated by a user's foot, knee, or elbow.

11. The hunting blind of claim 10, wherein the actuation rod extends from the cover to a base portion.

12. The hunting blind of claim 10, wherein the actuation rod is coupled to an inside of one of the first arcuate segment or the second arcuate segment.

13. The hunting blind of claim 10, wherein the upper arcuate segment is integral with the second arcuate segment.

14. The hunting blind of claim 10, wherein the cover is configured to cover a portion of the hollow interior.

* * * * *